US009087179B1

(12) United States Patent
Ansari et al.

(10) Patent No.: US 9,087,179 B1
(45) Date of Patent: Jul. 21, 2015

(54) SYSTEM FOR DETECTING AND CONVERTING DIGITAL RIGHTS MANAGEMENT PROFILES

(75) Inventors: Yasser Ansari, Mission Viejo, CA (US); Kotaro Matsuo, Poway, CA (US)

(73) Assignee: KYOCERA Corporation, Kyoto (JP)

( * ) Notice: Subject to any disclaimer, the term of this patent is extended or adjusted under 35 U.S.C. 154(b) by 2034 days.

(21) Appl. No.: 11/456,493

(22) Filed: Jul. 10, 2006

(51) Int. Cl.
G06F 21/10 (2013.01)

(52) U.S. Cl.
CPC ........................ G06F 21/10 (2013.01)

(58) Field of Classification Search
CPC ....................................... G06F 21/10
See application file for complete search history.

(56) References Cited

U.S. PATENT DOCUMENTS

| | | | | |
|---|---|---|---|---|
| 5,592,611 | A * | 1/1997 | Midgely et al. | 714/4 |
| 5,825,884 | A * | 10/1998 | Zdepski et al. | 705/78 |
| 6,219,692 | B1 * | 4/2001 | Stiles | 709/201 |
| 6,223,209 | B1 * | 4/2001 | Watson | 709/201 |
| 6,298,373 | B1 * | 10/2001 | Burns et al. | 709/203 |
| 6,370,580 | B2 * | 4/2002 | Kriegsman | 709/226 |
| 6,732,106 | B2 * | 5/2004 | Okamoto et al. | 707/784 |
| 2003/0046407 | A1 * | 3/2003 | Erickson et al. | 709/229 |
| 2003/0126086 | A1 * | 7/2003 | Safadi | 705/51 |
| 2006/0034335 | A1 | 2/2006 | Karaoguz et al. | |
| 2006/0242275 | A1 * | 10/2006 | Shapiro | 709/220 |
| 2007/0027814 | A1 * | 2/2007 | Tuoriniemi | 705/59 |
| 2008/0281943 | A1 * | 11/2008 | Shapiro | 709/218 |

OTHER PUBLICATIONS

"Import/Export in Digital Rights Management", Safavi-Naini et al. 2004 ACM Workshop on Digital Rights Management; pp. 99-110.*
Kramer, Jeff. "Chapter 3—Distributed Systems." Network and Distributed Systems Management. Ed. Morris Sloman. Wokingham, England: Addison-Wesley, 1994. Front matter, back matter, and pp. 47-66 included.*
"DOCSIS Cable Device MIB" Request for Comment 2669. Ed. M. St. Johns. 1999. Retrieved from <http://www.ietf.org/rfc/rfc2669.txt>.*

* cited by examiner

Primary Examiner — Rutao Wu
Assistant Examiner — Monica Mandel

(57) ABSTRACT

Systems and methods for automatically converting digital content from an incompatible to a compatible target DRM scheme are disclosed. In one embodiment, a user device transmits a request to a content server for digital content, the request including a target DRM scheme compatible with the user device. The content server determines that the requested target DRM scheme is incompatible with the native DRM scheme of the content server. A DRM matching server obtains the requested content from the content server and converts the content from the native DRM scheme to the target DRM scheme. The DRM matching server transmits the reformatted content to the user's device. Alternatively, the DRM matching server transmits the reformatted content to the content server, which transmits it to the user device. A user device includes any device capable of utilizing digital content, including cellular telephones, PDAs, audio file players, and video content display devices.

16 Claims, 12 Drawing Sheets

SYSTEM FOR DETECTING AND CONVERTING DIGITAL RIGHTS MANAGEMENT PROFILES

FIELD OF THE INVENTION

The present invention relates to digital rights management, and more particularly to converting digital content to a target digital rights management scheme.

BACKGROUND

Digital rights management ("DRM") schemes have been devised to protect against unapproved distribution of digital content. Under a typical DRM scheme, a user obtains digital content—an audio file, for example—from a content provider and is allowed to make only a certain number of copies, and/or to play the audio file on a limited number of playback devices. Where the content has been obtained under a subscription arrangement, as another example, the content may become unplayable once the subscription ends.

A growing problem is that while DRM schemes are proliferating, they are typically also incompatible with each other. That is, digital audio file purchased under one DRM scheme, for example, is unusable on a playback system operating under a different DRM scheme. A consumer must then either maintain a separate system for each DRM scheme associated with a content provider he or she wishes to obtain content from, or simply choose one content provider and deal strictly with one DRM scheme, but possibly suffer a loss of variety in accessible content.

Another problem arises where a user owns more that one playback device, a cell phone and an MP3 player, for example. The user may be required to obtain music files strictly from one vendor under a first DRM using the cell phone, and strictly from another vendor under a second DRM scheme using the MP3 player. But when a favorite music file is only available from the vendor supporting the MP3 player, the user will thus be prevented from transferring the file to the cell phone because of a DRM conflict.

Therefore, what is needed is a system and method for addressing these and other problems found in the conventional systems as described above.

SUMMARY

Various embodiments presently disclosed address the problem of incompatible DRM schemes by providing systems and methods for converting digital content from an incompatible native DRM scheme to a compatible target DRM scheme.

In one embodiment, a user device transmits a request to a content server for digital content, the request including information as to the target DRM scheme compatible with the user device. The content server receives the request and determines that the requested target DRM scheme is incompatible with the native DRM scheme used by the content server. A DRM matching server is then used to obtain the requested content from the content server and convert the content from a format according to the native DRM scheme to a format according to the target DRM scheme. The DRM matching server may then transmit the reformatted content directly to the user's device. Additionally, the DRM matching server may transmit the reformatted content back to the content server, which in turn transmits the content to the user device. The user device includes any kind of device capable of storing and/or utilizing digital content, including, for example, cellular telephones, personal digital assistants ("PDAs"), audio content playback devices, including MP3 players, and video content display devices. This embodiment, as well as others, thus enable a user to obtain and use digital content natively formatted at the content provider according to a DRM scheme incompatible with the user's device, which utilizes digital content formatted according to another ("target") DRM scheme.

In another embodiment, a method for providing content to a user device using a particular DRM scheme includes receiving a request for the content, determining the target DRM scheme for the content, obtaining the content, formatting the content according to the target DRM scheme, and providing the formatted content to the user device. Prior to formatting, the content may be obtained either in a format without a native DRM, or in a format according to a native DRM. Additionally, the content may be obtained in the target format from another source, and thus provided to the user device without reformatting.

Other features and advantages will become more readily apparent to those of ordinary skill in the art after reviewing the following detailed description and accompanying drawings.

BRIEF DESCRIPTION OF THE DRAWINGS

The details presently disclosed, both as to its structure and operation, may be gleaned in part by study of the accompanying drawings, in which like reference numerals refer to like parts, and in which.

DETAILED DESCRIPTION

Figure 1:
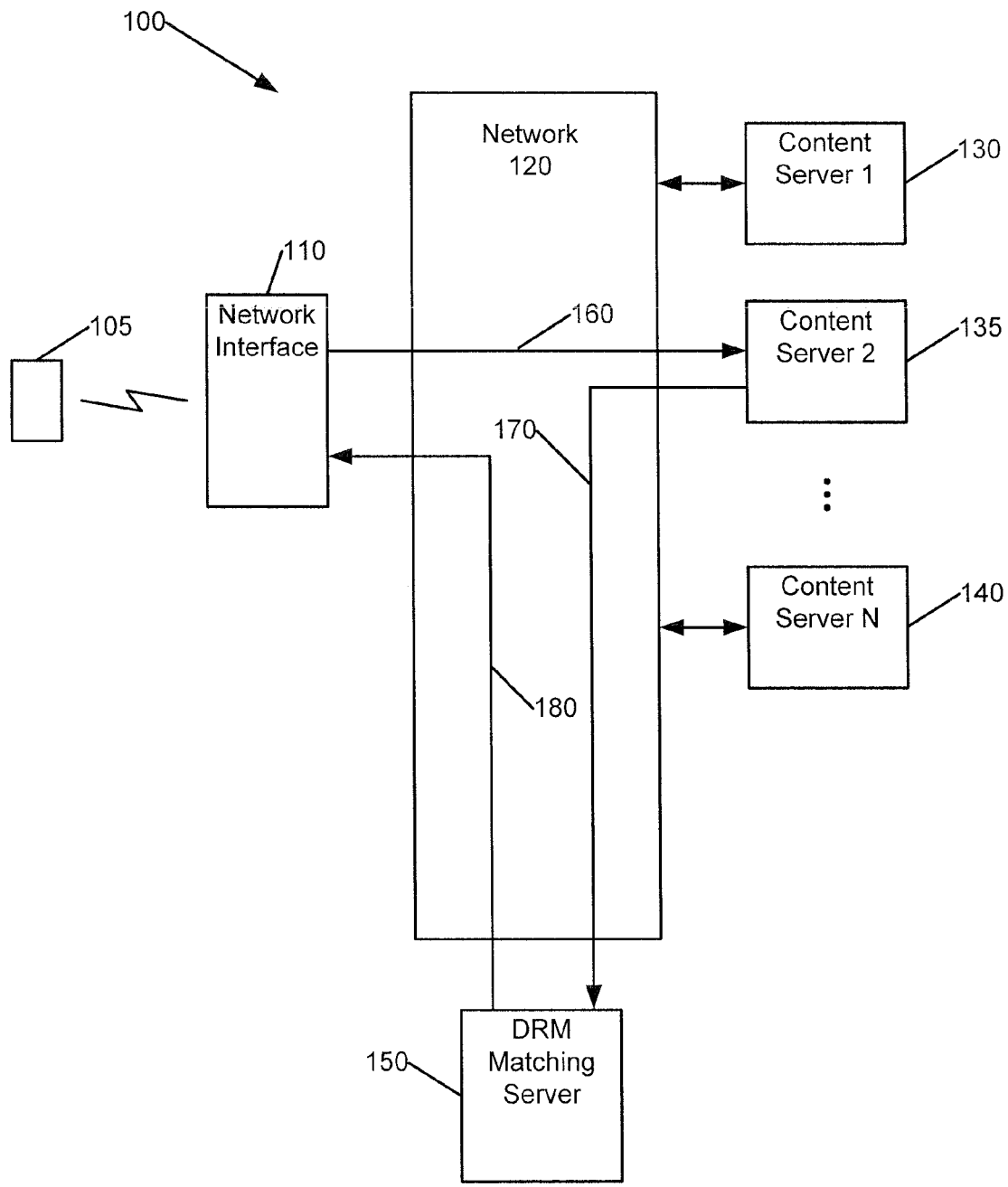
FIG. 1 is a functional block diagram illustrating an example interaction between a user device and a DRM matching server that may be used in connection with various embodiments described herein.

Certain embodiments as disclosed herein provide for conversion of digital content from a first ("native") digital rights management ("DRM") scheme to a second ("target") DRM scheme. For example, one method as disclosed herein provides for receiving a request from a user device for digital content, determining the target DRM scheme specified by the request, obtaining the digital content, formatting the digital content according to the target DRM, and providing the formatted digital content to the user device. The user device includes any device capable of utilizing digital content, such as a cell phone, MP3 player, any other digital music player, or PDA.

According to another example embodiment, a user device is a cell phone accessing the internet through a cellular system. The cell phone issues a request for an audio file to a content server, but the native DRM scheme of the content server is incompatible with the target DRM scheme of the user device. The content server sends the audio file to a DRM matching server which converts the audio file from the native DRM scheme to the target DRM scheme. The DRM matching server then sends the converted audio file to the cell phone. The user therefore is able to obtain the desired audio file under the appropriate DRM scheme even though the file was available from the content server only under an incompatible native DRM scheme. The transaction, however, is automatic and transparent to the user.

In another example, the user device is a PDA accessing the internet through a wireless local area network (e.g., Wi-Fi). A request for a video file is issued by the PDA and passed over the internet to a DRM matching server which determines from the request that content is desired from a particular content server, but the video file is only available from the content server in a native DRM scheme incompatible with the target DRM scheme of the PDA. The DRM matching server obtains the video file from the content server, reformats (i.e., converts) the file to the target DRM scheme, and sends the reformatted file to the PDA.

In yet another example, the user device is an MP3 device with access to the internet through a local area network. The MP3 device requests an MP3 file from a content server, but the native DRM of the content server is incompatible with the target DRM scheme of the user device. The content server receives the request and sends the requested MP3 file to a DRM matching server. The DRM matching server reformats/converts the file to the target DRM scheme and sends it back to the content server, and the content server then sends it to the user's MP3 device.

After reading this description it will become apparent to one skilled in the art having the benefit of the present disclosure how to implement it in various alternative embodiments and alternative applications. However, although various embodiments will be described herein, it is understood that these embodiments are presented by way of example only, and not limitation. As such, this detailed description of various alternative embodiments should not be construed to limit the scope or breadth of the various embodiments as set forth in the appended claims.

As used herein, the word "content" generally refers to data, including audio and video data typically subject to protections under a DRM scheme. The modifier "target" generally denotes a DRM scheme compatible with a user device. The modifier "native" generally denotes a DRM scheme applying to content stored by and/or accessed through a content server.

FIG. 1 is a functional block diagram illustrating example system interaction 100 between a user device and a DRM matching server that may be used in connection with various embodiments described herein. As shown in FIG. 1, user device 105 communicates with network interface 110. Network interface 110 is connected to network 120 to which content servers 130, 135, 140 and DRM matching server 150 are also connected. User device 105 may be any device at least capable of accepting and utilizing digital content, including a cell phone, MP3 player, computer, and a PDA. Examples of network interface 110 include cellular systems, such as CDMA, PCS, and GSM, Public Switched Telephone Networks ("PSTNs"), as well as wired and wireless network routers and gateways, and any other network connection. Network 120 includes a Wide Area Network ("WAN"), a wireless WAN ("WWAN"), a Local Area Network ("LAN"), a wireless LAN ("WLAN"), and any public or private IP-based network, including the internet.

In the example of FIG. 1, user device 105 communicates a request for digital content through network interface 110 and over first data path 160 to content server 135, the digital content formatted according to a target DRM compatible with user device 105. Content server 135 communicates over second data path 170 with DRM matching server 150. DRM matching server 150 obtains digital content from content server 135 over second data path 170 and converts the content according to the target DRM scheme used by user device 105. Alternatively, matching server 150 may obtain the content from a different content server 130, 140, or from a source local to DRM matching server 150, such as a database or local server module (not shown). Additionally, the digital content obtained by DRM matching server 150 may be formatted according to a DRM scheme native to content server 135, a DRM scheme not native to content server 135, or may be unformatted with respect to any DRM scheme. DRM matching server 150 provides the formatted digital content to user device 105 as exemplified by third data path 180, through network interface 110. It will be appreciated that any number of network protocols may be used for communications over data paths 160, 170, 180 depicted, including, for example, TCP/IP and UDP.

Figure 2:
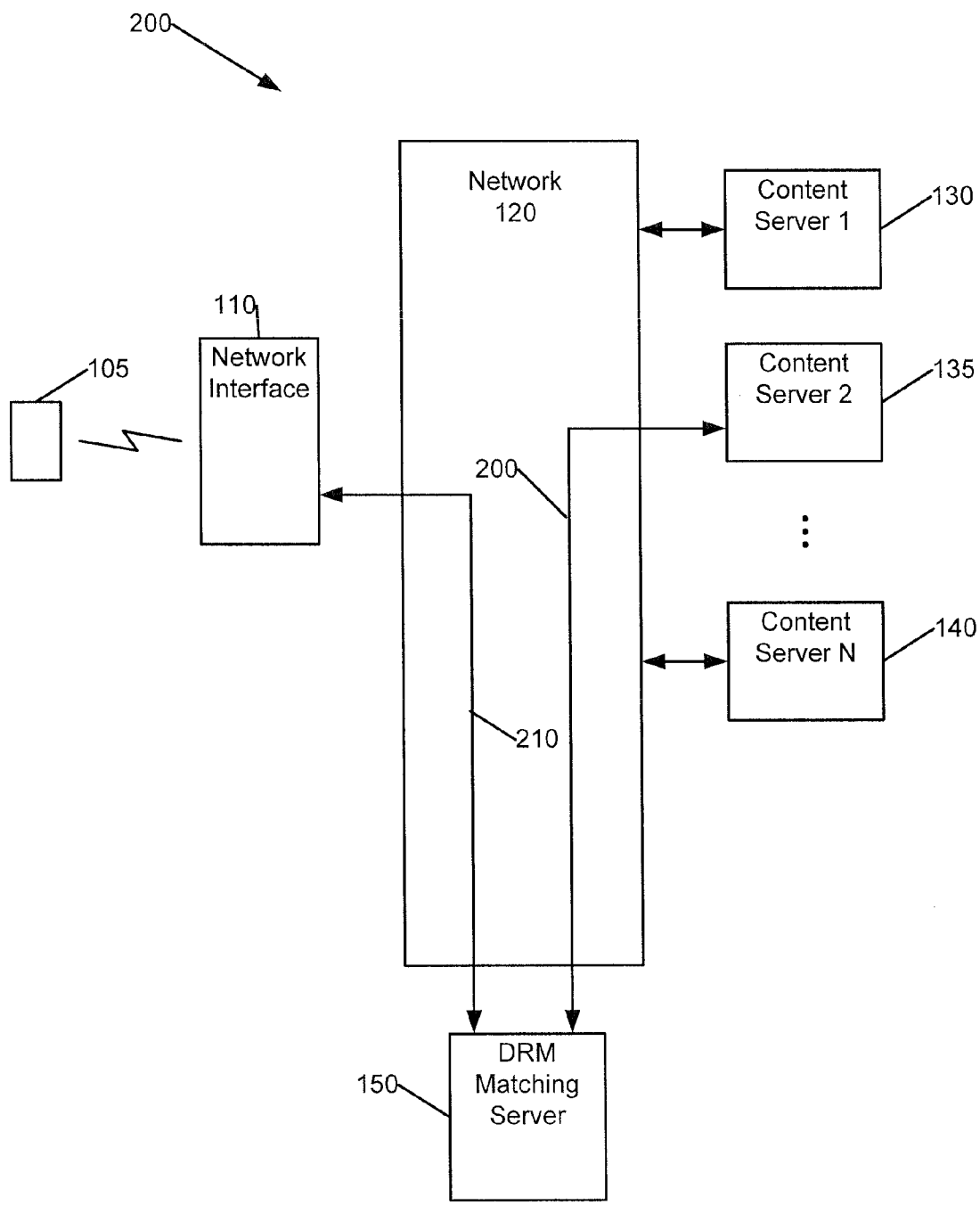
FIG. 2 is a functional block diagram illustrating another example interaction between a user device and a DRM matching server that may be used in connection with various embodiments described herein.

FIG. 2 is a functional block diagram illustrating another example system interaction 200 between a user device and DRM a matching server that may be used in connection with various embodiments described herein. As illustrated in FIG. 2, user device 105 communicates with network interface 110. Network interface 110 is connected to network 120 to which content servers 130, 135, 140 and DRM matching server 150 are also connected.

In the example of FIG. 2, user device 105 communicates a request for digital content through network interface 110 and over first example data path 210 to DRM matching server 150, the digital content formatted according to a target DRM compatible with user device 105. DRM matching server 150 communicates over second example data path 200 with content server 135. DRM matching server 150 obtains digital content from content server 135 over second data path 200 and converts the content according to the target DRM scheme used by user device 105. Alternatively, matching server 150 may obtain the content from a different content server 130, 140, or from a source local to DRM matching server 150, such as a database or local server module (not shown). Additionally, the digital content obtained by DRM matching server 150 from content server 135 may be formatted according to a native DRM scheme, a non-native DRM scheme, or may be unformatted with respect to any DRM scheme. After converting the content, DRM matching server 150 sends the formatted digital content to user device 105 over first data path 210, through network interface 110.

Figure 3:
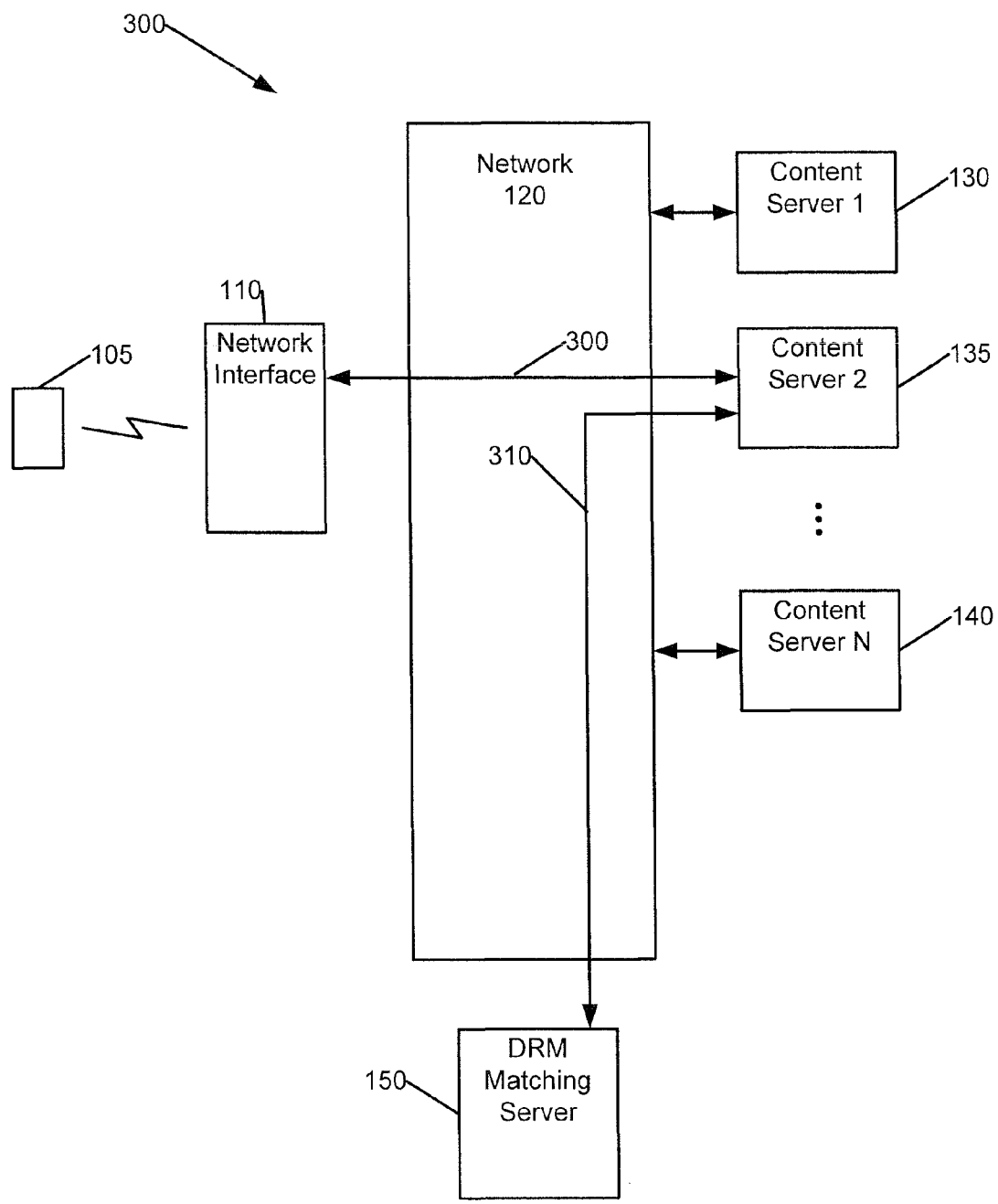
FIG. 3 is a functional block diagram illustrating another example interaction between a user device and a DRM matching server that may be used in connection with various embodiments described herein.

FIG. 3 is a functional block diagram illustrating another example interaction 300 between a user device and a DRM matching server that may be used in connection with various embodiments described herein. Depicted in FIG. 3, user device 105 communicates with network interface 110. Network interface 110 communicates with network 120 to which content servers 130, 135, 140 and DRM matching server 150 are also connected.

In the example of FIG. 3, user device 105 communicates a request for digital content through network interface 110 and over first data path 300 to content server 135, the digital content formatted according to a target DRM compatible with user device 105. Content server 135 communicates over second example data path 310 with DRM matching server 150. DRM matching server 150 obtains digital content from content server 135 over second data path 310 and converts the content according to the target DRM scheme used by user device 105. Alternatively, matching server 150 may obtain the content from a different content server 130, 140, or from a source local to DRM matching server 150, such as a database or local server module (not shown). Additionally, the digital content obtained by DRM matching server 150 from content server 135 may be formatted according to a native DRM scheme, a non-native DRM scheme, or may be unformatted with respect to any DRM scheme. DRM matching server 150 provides the formatted digital content to content server 135 over second path 310. Content server 135 then passes the digital content to user device 105 over first example data path 300, through network interface 110.

Figure 4:
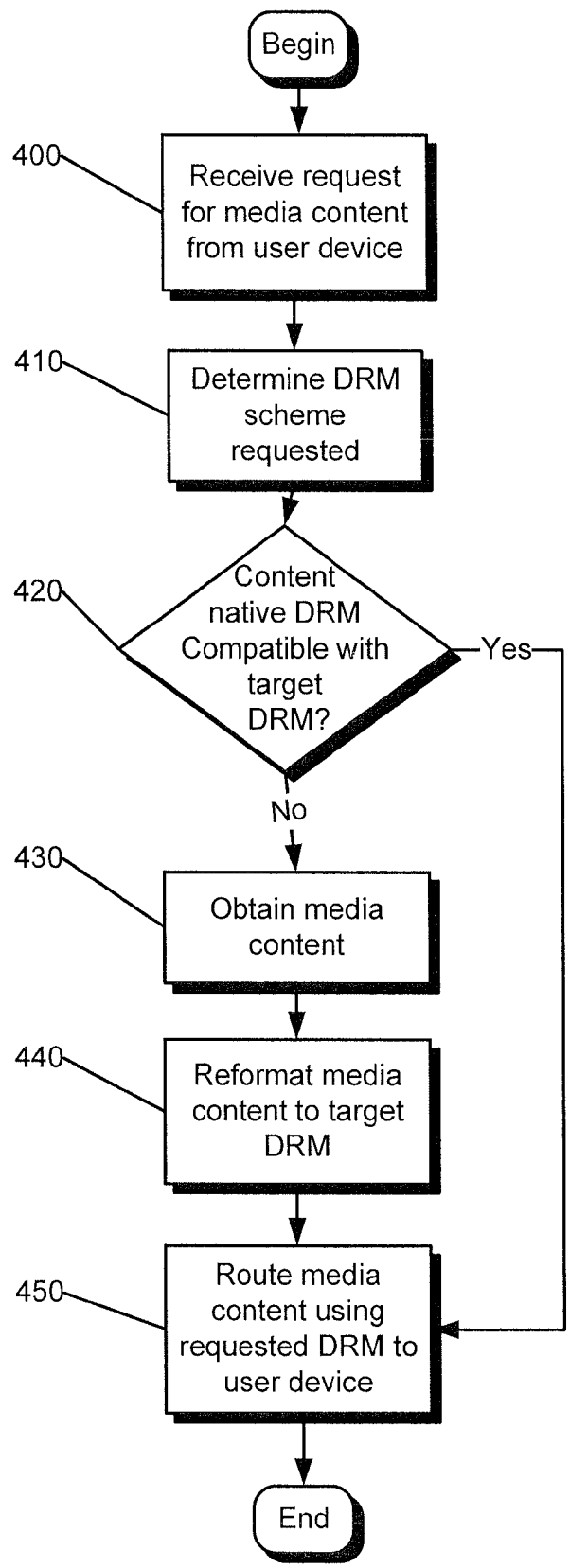
FIG. 4 is a flowchart illustrating an example method of providing content according to a target DRM that may be used in connection with various embodiments described herein.

FIG. 4 is a flowchart illustrating an example method of providing content according to a target DRM that may be used in connection with various embodiments described herein. As shown in FIG. 4, at block 400, a request is received from user device 105 for media content. Generally, the request may be for any kind of digital content under a DRM scheme.

At block 410, a determination is made as to what the requested target DRM scheme is. In one embodiment, the requested DRM scheme includes a request that no DRM scheme be associated with the content. If it is determined at block 420 that the native DRM scheme of the requested media content is already formatted according to or compatible with the target DRM scheme, then at block 450, the content is provided to user device 105. However, if it is determined at block 420 that the requested media content is formatted according to a DRM scheme that is different from or incompatible with the target DRM scheme, then block 430 is carried out, and the media content is obtained from the content source.

At block 430, the media content may be obtained using multiple methods. One method includes obtaining a media file formatted according to a native DRM scheme from content server 130, 135, 140. Another method includes obtaining the media content not formatted according to a DRM scheme from a file. Yet another method includes obtaining a media content file from another source, where the media content file is formatted according to the target DRM scheme, formatted according to a DRM scheme different from the target DRM scheme, or not formatted according to any DRM scheme. It will be appreciated that there are many other methods for obtaining the media content not mentioned herein.

At block 440, the content media is reformatted according to the requirements of the target DRM, and routed at block 450 to user device 105. As discussed above, routing the media content includes transmitting over network 120, the network including a WAN, a WWAN, a LAN, a WLAN, and any public or private IP-based network, including the internet. It will further be appreciated that the method illustrated in FIG. 4 may be practiced in alternate ways to achieve substantially the same result.

Figure 5:
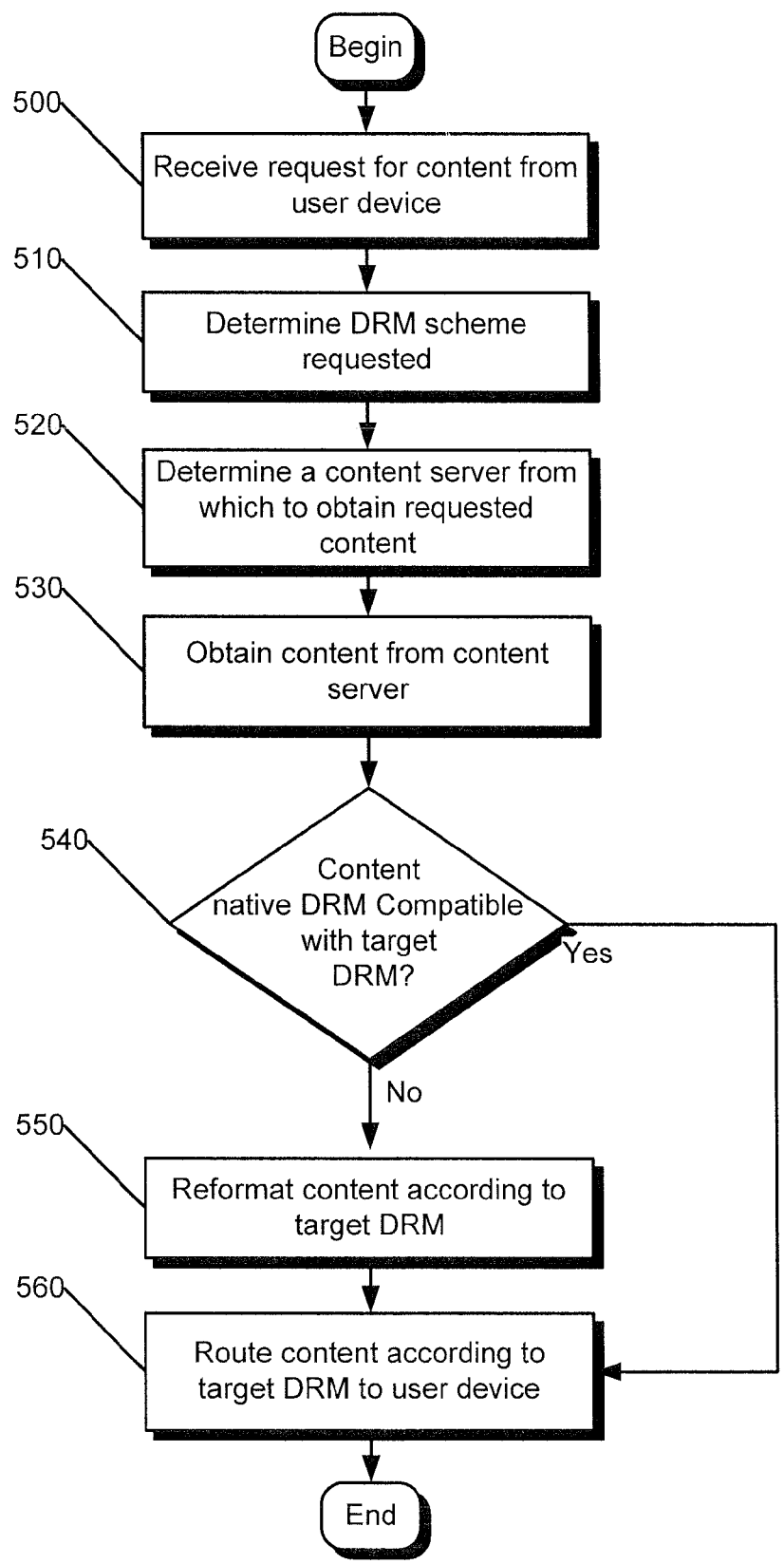
FIG. 5 is a flowchart illustrating another example method of providing content according to a target DRM that may be used in connection with various embodiments described herein.

FIG. 5 is a flowchart illustrating another example method of providing content according to a target DRM that may be used in connection with various embodiments described herein. At block 500, a request is received from user device 105 for content. Additionally, the request may include information as to the target DRM scheme appropriate for user device 105. At block 510, a determination is made as to what the requested target DRM scheme is. Content server 130, 135, 140 is next determined, at block 520, from which the requested content shall be obtained. In one example, the content may only be obtained from one of content servers 130, 135, 140. In another example, the requested content may be obtainable from a plurality of content servers 130, 135, 140. Additionally, each content server 130, 135, 140 may provide content formatted according to a native DRM scheme.

At block 530, content is then obtained from content server 130, 135, 140. The content is typically downloaded over network 120 connecting content servers 130, 135, 140 and the entity executing the method according to this example. The content thus obtained may already be formatted according to a number of various DRM schemes, including the requested target DRM scheme.

If it is determined at block 540 that the native DRM scheme of the requested media content is already formatted according to or compatible with the target DRM scheme, then at block 560, the content is provided to user device 105. However, if it is determined at block 540 that the requested media content is formatted according to a DRM scheme that is different from or incompatible with the target DRM scheme, then block 550 is carried out, and the content is reformatted according to the target DRM scheme, and at block 560 provided to user device 105.

As discussed in the foregoing, providing the content at block 560 includes transmitting over network 120, the network including a WAN, a WWAN, a LAN, a WLAN, and any public or private IP-based network, including the internet. It will further be appreciated that the method illustrated in FIG. 5 may be practiced in alternate ways to achieve a similar result.

Figure 6:
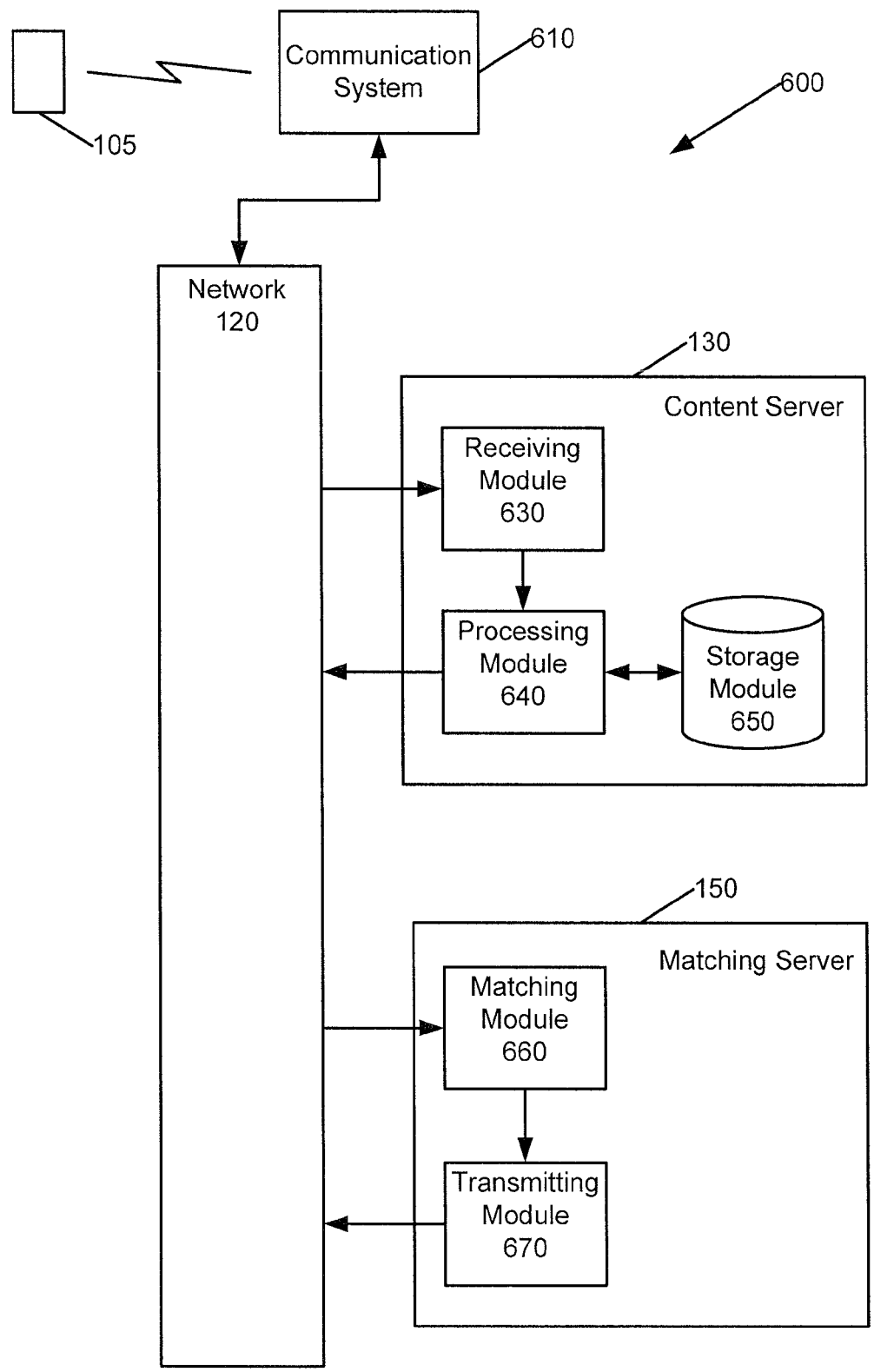
FIG. 6 is a functional block diagram illustrating an example system for providing content according to a target DRM that may be used in connection with various embodiments described herein.

FIG. 6 is a functional block diagram illustrating an example system 600 for providing digital content according to a target DRM that may be used in connection with various embodiments described herein. User device 105 communicates with communication system 610, and communication system 610 maintains a link with network 120. According to one example embodiment, user device 105 is a cellular phone, and communication system 610 is a cellular phone system. Network 120 serves to connect communication system 610 with at least one content server 130 and DRM matching server 150. As shown, content server 130 includes receiving module 630, processing module 640, and storage module

650. Storage module 650 typically, though not necessarily contains digital content according to a DRM scheme native to content server 130. Content server 130 may alternatively host digital content under a native DRM scheme, but under which the actual content is stored by storage module 650 without any special formatting according to the native DRM scheme. DRM matching server 150 includes matching module 660 and transmitting module 670.

User device 105 transmits a request for digital content to communication system 610, which forwards the request to network 120. In the example of user device 105 as a cell phone, the request may be for a digital audio file comprising a desired song, which is transmitted by cell phone 105 to cellular system 610, which transmits the request onto network 120. The request includes information as to the digital content of interest, the source for the digital content, and the target DRM scheme in use by user device 105.

The request for digital content is received by receiving module 630 of content server 130 addressed by the request. Receiving module 630 passes the request to processing module 640, which is operable to determine the desired digital content and the target DRM scheme from the information contained by the request. Processing module 640 obtains the requested digital content from storage module 650. When the obtained digital content is already formatted according to the target DRM scheme, or is formatted according to a DRM scheme that is otherwise compatible with the target DRM scheme, then processing module 640 transmits the digital content to user device 105 over network 120 and communication system 610. When the obtained digital content is already formatted according to a DRM scheme that is incompatible with the target DRM scheme, processing module 640 transmits the digital content and conversion instructions to DRM matching server 150.

The digital content and conversion instructions are received by matching module 660, which further determines the target DRM scheme and the native DRM scheme of content server 130. Alternatively, content server 130 may transmit the conversion instructions to matching server 150, with which matching module 660 obtains the digital content from content server 130 when ready. Once matching module 660 has obtained the digital content, it converts the digital content from the native DRM scheme to the target DRM scheme. The digital content thus reformatted according to the target DRM scheme is passed to transmitting module 670 which transmits the content over network 120 and communication system 610 to user device 105.

According to another example, as mentioned above, the digital content is stored by storage module 650 without any formatting according to a DRM scheme. In this case, after receiving the conversion instructions and digital content from content server 130, matching module 660 of matching server 150 converts the digital content from the DRM-free format to the target DRM scheme. The reformatted digital content is then passed to transmitting module 670 which transmits the content to user device 105 over network 120 and communications system 610.

Figure 7:
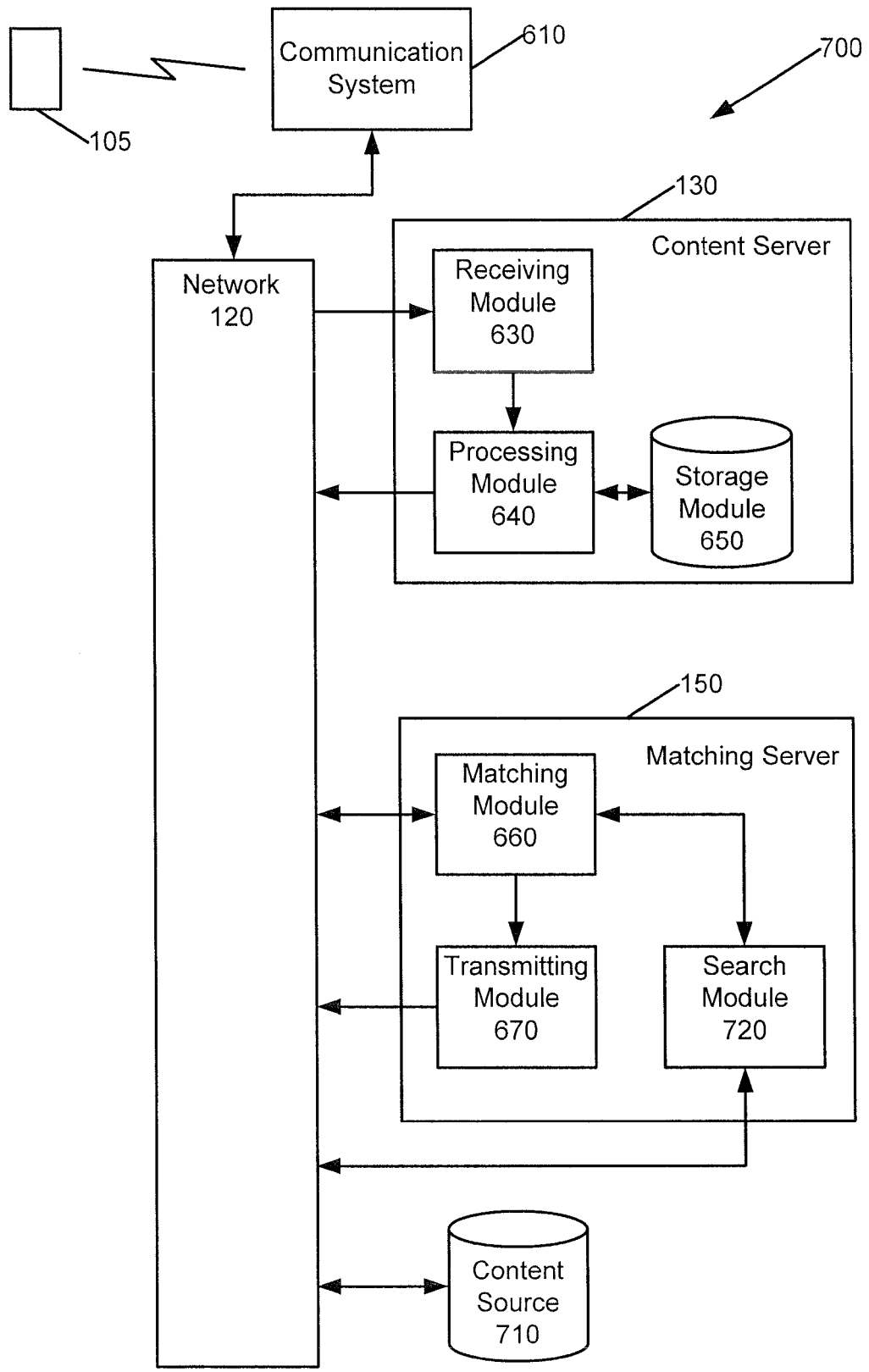
FIG. 7 is a functional block diagram illustrating another example system using an alternate content source for providing content according to a target DRM that may be used in connection with various embodiments described herein.

FIG. 7 is a functional block diagram illustrating another example system 700 using an alternate content source for providing content according to a target DRM that may be used in connection with various embodiments described herein. User device 105 communicates with communication system 610. Communication system 610 maintains a link with network 120. According to one example embodiment, user device 105 is a cellular phone, and communication system 610 is a cellular phone system. Network 120 serves to connect communication system 610 with at least one content server 130, DRM matching server 150, and alternate content source 710. Alternate content source 670 may be content server 135, 140, or any other entity capable of providing digital content. The alternate content source is typically accessible over network 120, as illustrated, which includes a Wide Area Network ("WAN"), a wireless WAN ("WWAN"), a Local Area Network ("LAN"), a wireless LAN ("WLAN"), and any public or private IP-based network, including the internet As shown, content server 130 includes receiving module 630, processing module 640, search module 720, and storage module 650. Storage module 650 typically contains, though not necessarily, digital content formatted according to a native DRM scheme of content server 130. Content server 130 may alternatively host digital content under a native DRM scheme, but under which the actual content is stored by storage module 650 without any special formatting according to the native DRM scheme. DRM matching server 150 includes matching module 660 and transmitting module 670.

User device 105 transmits a request for digital content to communication system 610, which forwards the request to network 120. In the example of user device 105 as a cell phone, the request may be for a digital audio file comprising a desired song, which is transmitted by cell phone 105 to cellular system 610, which transmits the request onto network 120. The request includes information as to the digital content of interest, the source for the digital content, and the target DRM scheme in use by user device 105.

The request for digital content is received by receiving module 630 of content server 130 addressed by the request. Receiving module 630 passes the request to processing module 640, which is operable to determine the desired digital content and the target DRM scheme from the information contained by the request. When the native DRM scheme of content server 130 is compatible with the requested target DRM scheme, processing module 640 obtains the requested digital content from storage module 650 and transmits the digital content to user device 105 over network 120 and communication system 610. When the native DRM scheme of content server 130 is incompatible with the requested target DRM scheme, processing module 640 transmits instructions to matching server 150, the instructions containing information as to the requested digital content and the target DRM scheme.

The instructions are received by matching module 660, which identifies the requested digital content and target DRM scheme. An instruction is passed to search module 720, which seeks out an accessible location of the requested digital content formatted according to the target DRM scheme. As illustrated in the example of FIG. 7, the requested content is located at an alternate content source 710, where it is maintained in a format according with the target DRM scheme. Matching module 660 may then obtain the digital content from alternate content source 710 and pass it to transmitting module 670 to transmit the content over network 120 and communication system 610 to user device 105. In this example, a search is thus made for the requested digital content already formatted in the requested target DRM format in lieu of reformatting the digital content from a native DRM scheme to accord with the target DRM scheme.

Figure 8:
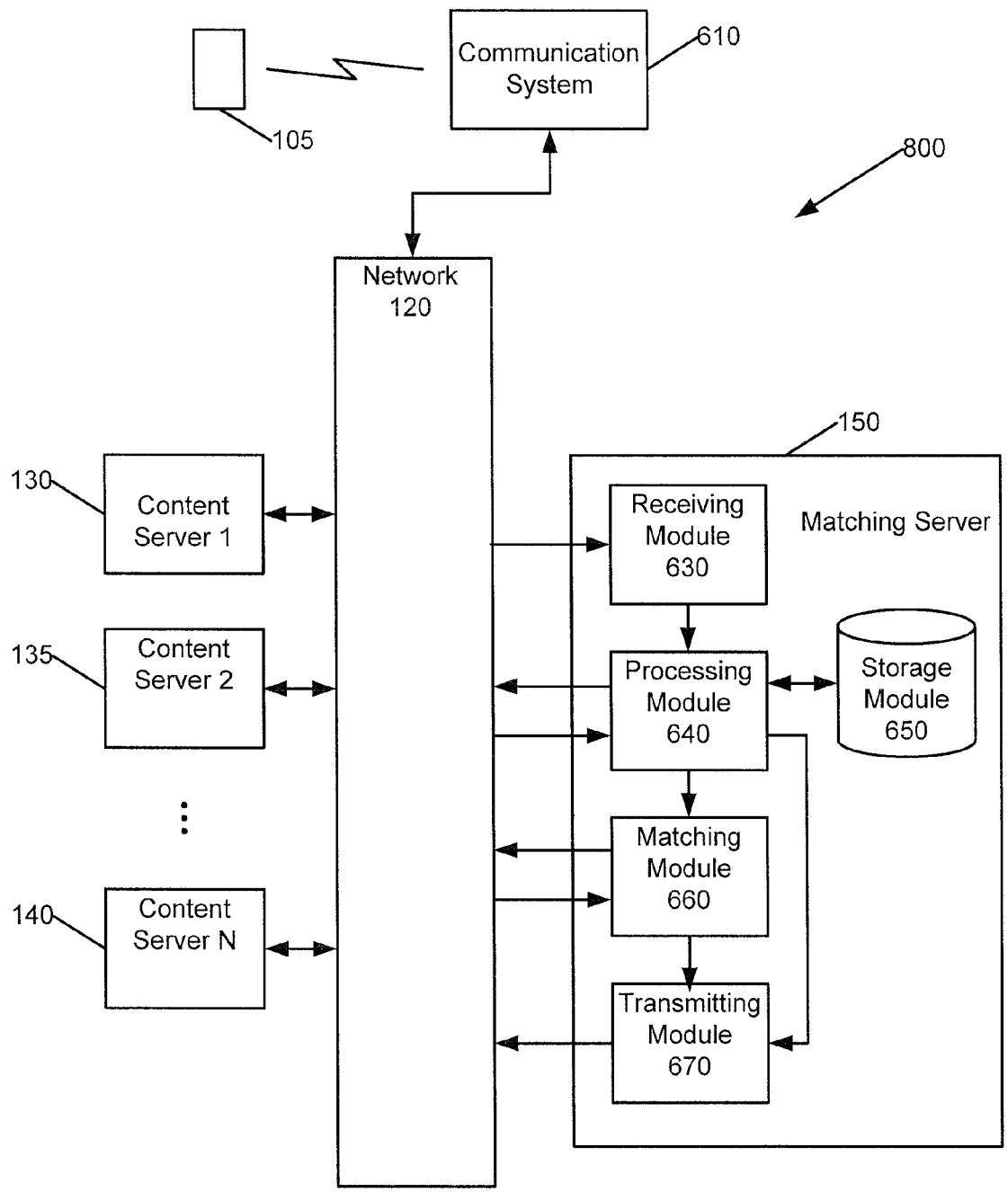
FIG. 8 is a functional block diagram illustrating another example system using a main DRM matching server for providing content according to a target DRM that may be used in connection with various embodiments described herein.

FIG. 8 is a functional block diagram illustrating another example system 800 using a main DRM matching server for providing content according to a target DRM that may be used in connection with various embodiments described herein. User device 105 communicates with communication system 610, and communication system 610 maintains a link with network 120. According to one example embodiment, user device 105 is a cellular phone, and communication system 610 is a cellular phone system. Network 120 serves to connect communication system 610 with DRM matching server 150 and content servers 130, 135, 140. As shown, matching server 150 includes receiving module 630, processing module 640, storage module 650, matching module 660, and transmitting module 670. Storage module 650 typically contains, though not necessarily, digital content according to a DRM scheme native to matching server 150. Matching server 150 may alternatively host digital content under a native DRM scheme, but under which the actual content is stored by storage module 650 without any special formatting according to the native DRM scheme. Additionally, digital content may be stored by storage module 650 without any formatting according with a DRM scheme. In another example, storage module 650 is optional, and all digital content is obtained from content servers 130, 135, 140.

User device 105 transmits a request for digital content to communication system 610, which forwards the request to network 120. In the example of user device 105 as a cell phone, the request may be for a digital audio file comprising a desired song, which is transmitted by cell phone 105 to cellular system 610, which transmits the request onto network 120. The request includes information as to the digital content of interest, the source for the digital content, and the target DRM scheme in use by user device 105.

The request for digital content is received by receiving module 630 of matching server 150 addressed by the request. Receiving module 630 passes the request to processing module 640, which is operable to determine the desired digital content and the target DRM scheme from the information contained by the request. Processing module 640 obtains the requested digital content from storage module 650. Optionally, where DRM matching server 150 does not include storage module 650 for storing digital content, the processing module is operable to seek and obtain the requested digital content from content servers 130, 135, 140.

When the digital content obtained by processing module 640 is formatted according to the target DRM scheme, or is formatted according to a DRM scheme that is otherwise compatible with the target DRM scheme, then processing module 640 passes the digital content to transmitting module 670 to transmit to user device 105 over network 120 and communication system 610. When the obtained digital content is formatted according to a DRM scheme that is incompatible with the target DRM scheme, processing module 640 passes the digital content and conversion instructions to DRM matching module 660.

Alternatively, where DRM matching server 150 does not include storage module 650 for storing digital content, processing module 640 passes to matching module 660 instructions specifying the requested digital content and target DRM scheme. Matching module 660 then seeks and obtains the requested digital content from content servers 130, 135, 140.

Matching module 660 then converts the obtained digital content to a format according to the target DRM scheme. The reformatted digital content is passed to transmitting module 670, which transmits the content over network 120 and communication system 610 to user device 105.

According to another example, as mentioned above, the digital content is stored by storage module 650 without formatting according to a particular DRM scheme. In this case, after receiving the conversion instructions and digital content from processing module 640, matching module 660 converts the digital content from the DRM-free format to the format of the target DRM scheme. The reformatted digital content is then passed to transmitting module 670, which transmits the content to user device 105 over network 120 and communications system 610. In this way, a single matching server 150 may provide to user device 105 digital content formatted according to a plurality of DRM schemes.

Figure 9:
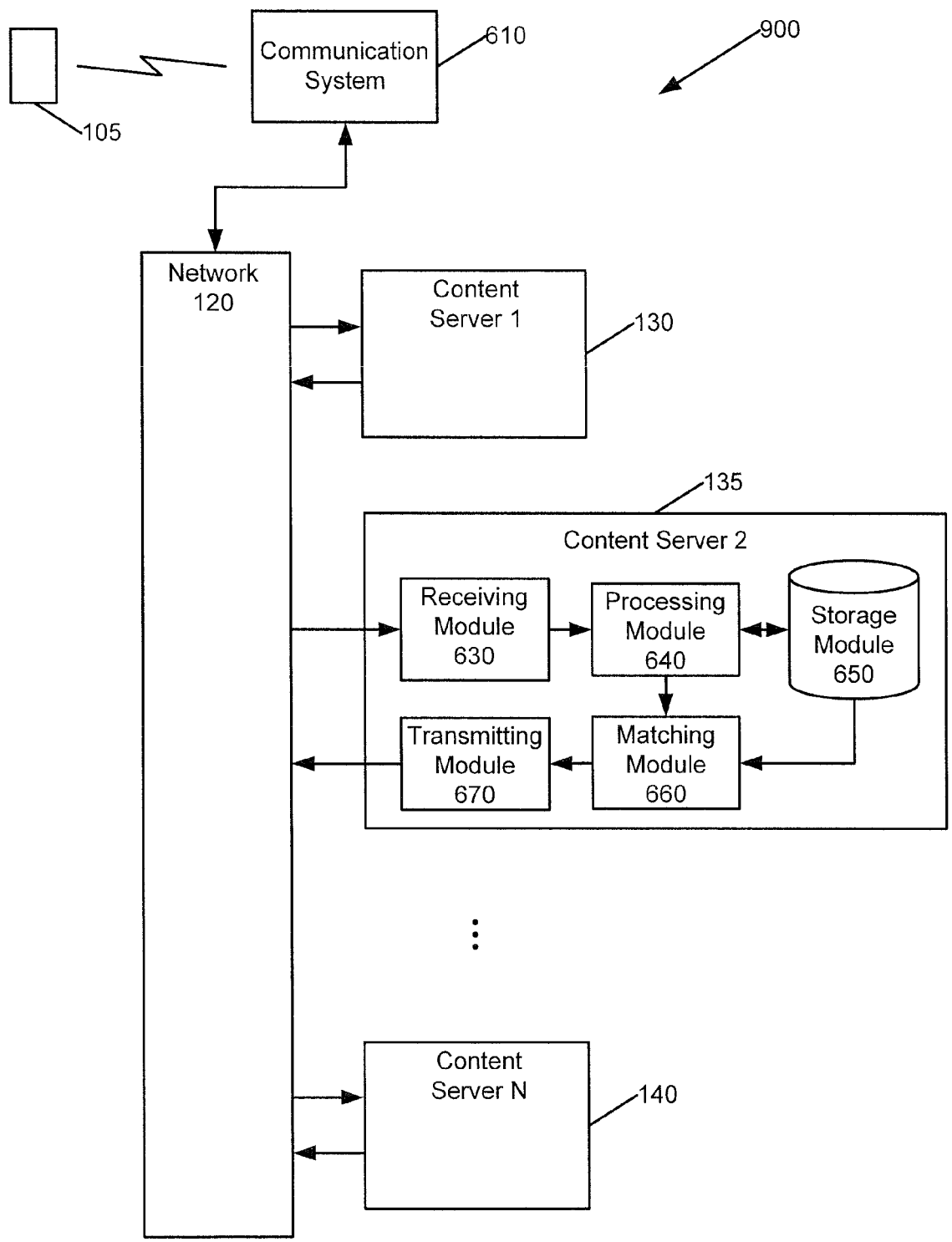
FIG. 9 is a functional block diagram illustrating another example system using slave matching modules in content servers for providing content according to a target DRM that may be used in connection with various embodiments described herein.

FIG. 9 is a functional block diagram illustrating another example system 900 using slave matching modules in content servers for providing content according to a target DRM that may be used in connection with various embodiments described herein. User device 105 communicates with communication system 610, and communication system 610 maintains a link with network 120. According to one example embodiment, user device 105 is a cellular phone, and communication system 610 is a cellular phone system. Network 120 serves to connect communication system 610 with N content servers 130, 135, 140. Typified by the depiction of content server 135, each content server 130, 135, 140 includes receiving module 630, processing module 640, storage module 650, matching module 660, and transmitting module 670. Each particular content server 130, 135, 140 may host digital content according to a different DRM scheme, under which the digital content for each content server 130, 135, 140 is thus formatted according to its native DRM scheme. Alternatively, while a content server 130, 135, 140 may host digital content under a native DRM scheme, the actual content may be stored without any special formatting according to the native DRM scheme.

User device 105 transmits a request for digital content to communication system 610, which forwards the request to network 120. In the example of user device 105 as a cell phone, the request may be for a digital audio file comprising a desired song, which is transmitted by cell phone 105 to cellular system 610, which transmits the request onto network 120. The request includes information as to the digital content of interest, the source for the digital content, and the target DRM scheme in use by user device 105.

The request for digital content is received, for example, by receiving module 630 of content server 135 to which the request is addressed. Receiving module 630 passes the request to processing module 640, where processing module 640 is operable to determine the desired digital content and the target DRM scheme from the information contained by the request. Processing module 640 of content server 135 obtains the requested digital content from storage module 650. When the digital content thus obtained is already formatted according to the target DRM scheme, or is formatted according to a DRM scheme that is otherwise compatible with the target DRM scheme, then content server 135 transmits the digital content to user device 105 over network 120 and communication system 610. When the obtained digital content is already formatted according to a DRM scheme that is incompatible with the target DRM scheme, processing module 640 passes the digital content and conversion instructions to matching module 660.

The digital content and conversion instructions are received by matching module 660, which determines the target DRM scheme and the native DRM scheme of content server 135. Alternatively, processing module 640 may transmit the conversion instructions to matching module 660, which obtains the digital content from storage module 650 when ready. Once matching module 660 has obtained the digital content, it converts the digital content from the native DRM scheme to the target DRM scheme. The digital content thus reformatted is passed to transmitting module 670, which transmits the content over network 120 and communication system 610 to user device 105.

According to another example, as mentioned above, the digital content is stored by storage module 650 without any formatting according to a DRM scheme. In this case, after receiving the conversion instructions and digital content from storage module 650, matching module 660 converts the digital content from the DRM-free format to the target DRM scheme. The reformatted digital content is then passed to transmitting module 670, which transmits the content to user device 105 over network 120 and communications system 610.

Figure 10:
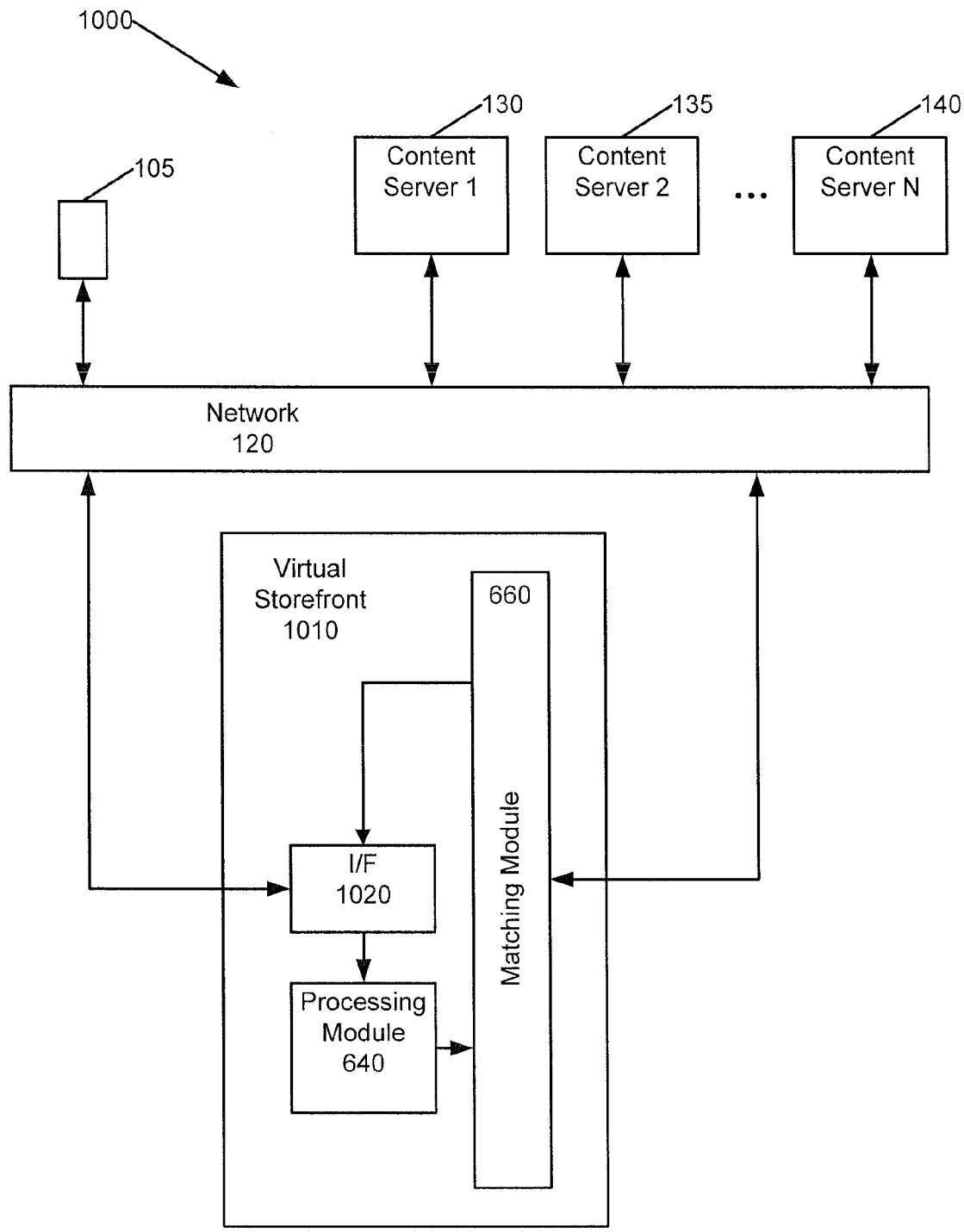
FIG. 10 is a functional block diagram illustrating another example system using a virtual storefront for providing content according to a target DRM that may be used in connection with various embodiments described herein.

FIG. 10 is a functional block diagram illustrating another example system 1000 using virtual storefront 1010 for providing content according to a target DRM that may be used in connection with various embodiments described herein. User device 105 communicates with interface 1020 with virtual storefront 1010. In one example, virtual storefront 1010 is a web-based service offering digital content for sale. According to another example, user device 105 is a cellular phone, and communication system 610 is a cellular phone system. Alternatively, user device 105 is a computer or a PDA. It will be appreciated that virtual storefront 1010 is typically accessed by user device 105 through a network (not shown), including a WAN, a WWAN, a LAN, a WLAN, and any public or private IP-based network, including the internet.

As shown, virtual storefront 1010 further includes processing module 640 and matching module 660. Content servers 130, 135, 140 are in communication with virtual storefront 1010. Each particular content server 130, 135, 140 may host digital content according to a different DRM scheme, under which the digital content for each content server 130, 135, 140 is thus formatted according to its native DRM scheme. Alternatively, where content server 130, 135, 140 may host digital content under a native DRM scheme, the actual content may be stored without any special formatting according to the native DRM scheme, and is formatted according to the DRM scheme before external transmission.

User device 105 transmits a request for digital content to virtual storefront 1010. In the example of user device 105 as a cell phone, the request may be for a digital audio file comprising a desired song. The request includes information as to the digital content of interest and the target DRM scheme in use by user device 105.

The request for digital content is received, for example, through interface 1020 and passed to processing module 640. Processing module 640 determines information including the desired digital content and the target DRM scheme from the request. Processing module 640 then passes the information to matching module 660. Matching module 660, according to one example, then determines from which content server 130, 135, 140 the requested digital content may be obtained. Additionally, if the requested content is available from multiple content servers 130, 135, 140, then a further determination may be made as to which content server 130, 135, 140 makes available the requested content under a DRM scheme compatible with the target DRM scheme. Further, other factors such as price and business arrangements between the storefront operator and content providers, may also affect the selection of content server 130, 135, 140 for any given transaction. After a content server 130, 135, 140 is selected, matching module 660 obtains the requested digital content.

When the digital content thus obtained is already formatted according to the target DRM scheme, or is formatted according to a DRM scheme that is otherwise compatible with the target DRM scheme, then matching module 660 passes the digital content to storefront interface 1020 where it is transmitted to user device 105. When the obtained digital content is already formatted according to a DRM scheme that is incompatible with the target DRM scheme, matching module 660 converts the digital content from the incompatible DRM scheme to the target DRM scheme. The digital content thus reformatted is passed to storefront interface 1020 where it is transmitted to user device 105.

According to another example, as mentioned above, the digital content is stored by selected content server 130, 135, 140 without any formatting according to a DRM scheme. In this case, after obtaining the digital content, matching module 660 converts the digital content from the DRM-free format to the target DRM scheme. The reformatted digital content is then passed to storefront interface 1020, which transmits the content to user device 105.

Figure 11:
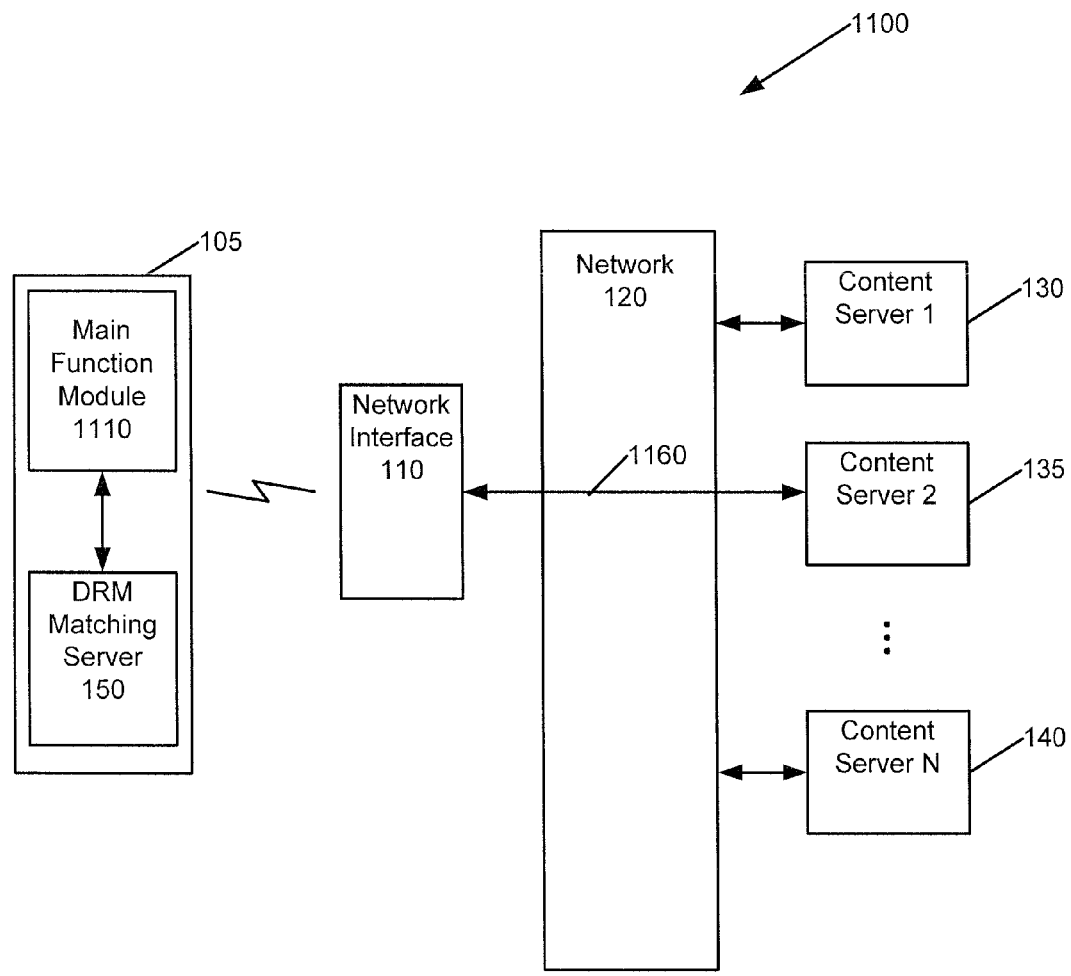
FIG. 11 is a functional block diagram illustrating another example interaction between a user device and a DRM matching server that may be used in connection with various embodiments described herein.

FIG. 11 is a functional block diagram illustrating another example system interaction 1160 between a user device and a DRM matching server that may be used in connection with various embodiments described herein. Network interface 110 is connected to network 120 to which content servers 130, 135, 140 are also connected. As illustrated in FIG. 11, DRM matching server 150 resides within user device 105.

In the example of FIG. 11, user device 105 communicates a request for digital content through network interface 110 and over example data path 1160 to content server 135. Content server 135 responds by providing requested content over example data path 1160 through network interface 110 to user device 105. The digital content delivered by the content server may be formatted according to a DRM scheme native to content server 135, formatted according to a DRM scheme non-native to content server 135, or unformatted with respect to any DRM scheme.

User device 105 includes DRM matching server 150. In a case where the content is not formatted according to a DRM scheme appropriate for user device 105 (e.g., the target DRM scheme), DRM matching server 150 reformats the content according to the target DRM scheme. The content is then provided to main function module 1110. Where the content has been received unformatted, or already formatted according to the target DRM scheme, no further processing is required and the content is provided to main function module 1110.

Figure 12:
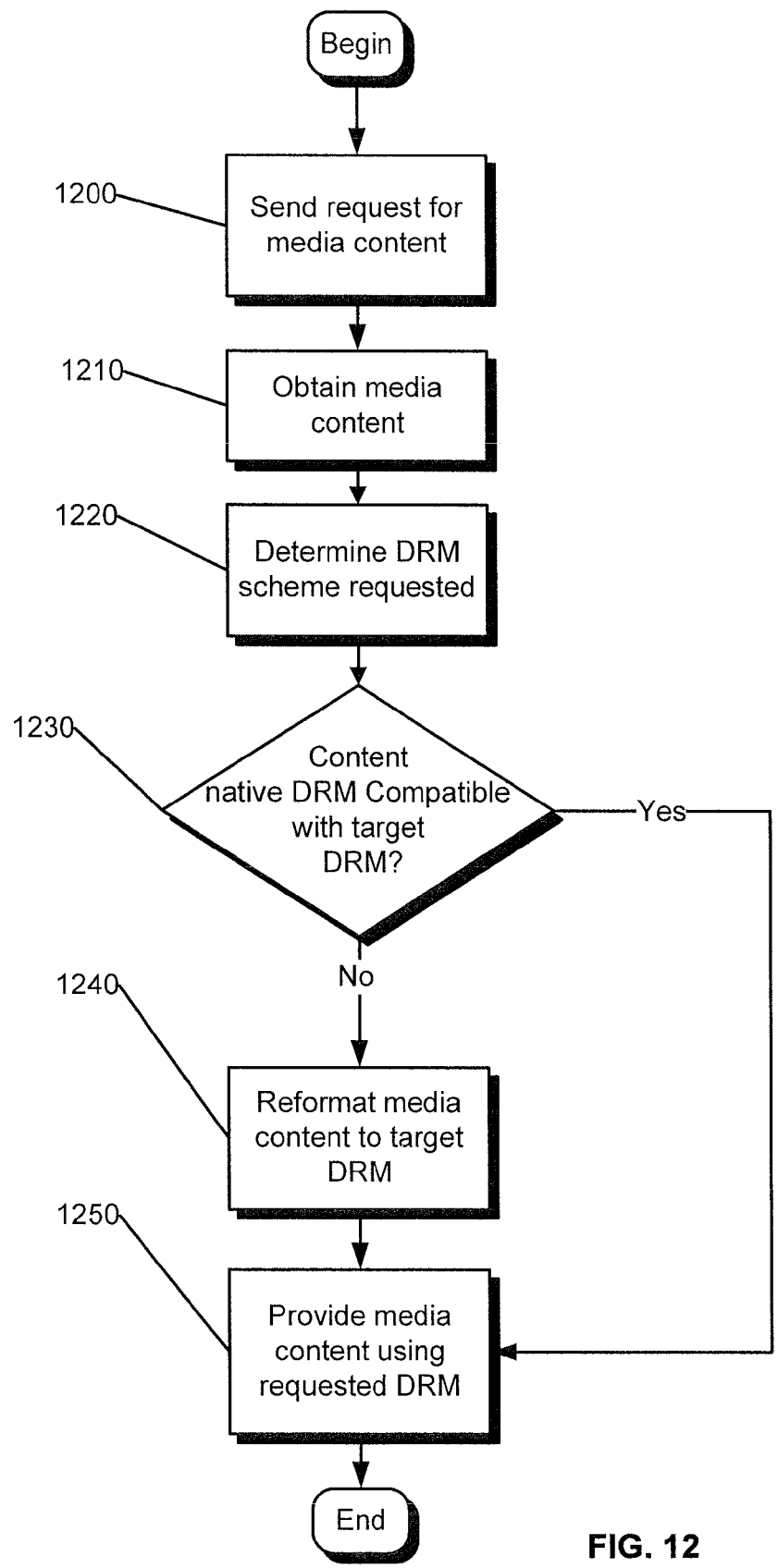
FIG. 12 is a flowchart illustrating another example of providing content according to a target DRM that may be used in connection with various embodiments described herein.

FIG. 12 is a flowchart illustrating an example method of providing content according to a target DRM that may be used in connection with various embodiments described herein. As shown in FIG. 12, at block 1200, a request is sent from user device 105 for media content. Generally, the request may be for any kind of digital content, including audio, image, and video content. At block 1210, the requested content is obtained by user device 105 from a corresponding server. As shown in the example of FIG. 11, DRM server 150 within user device 105 determines whether the DRM scheme received matches the target DRM scheme supported by user device 105. At block 1220, the requested DRM scheme is determined.

If it is determined at block 1230 that the native DRM scheme of the requested media content is already formatted according to or compatible with the target DRM scheme, then at block 1250, the content is provided to user device 105. However, if it is determined at block 1230 that the requested media content is formatted according to a DRM scheme that is different from or incompatible with the target DRM scheme, then block 1240 is carried out, and DRM server 150 reformats the media content and provides the media content at block 1250 to main function module 1110 of user device 105.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art.

Various embodiments may also be implemented using a combination of both hardware and software.

Furthermore, those of skill in the art having the benefit of this disclosure will appreciate that the various illustrative logical blocks, modules, connectors, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons having the benefit of this disclosure can implement the described functionality in varying ways for each particular application, but such implementation decisions should not be interpreted as causing a departure from the scope presently disclosed. In addition, the grouping of functions within a module, block, circuit or step is for ease of description. Specific functions or steps can be moved from one module, block or circuit to another without departing from the present disclosure.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the present disclosure. Various modifications to these embodiments will be readily apparent to those skilled in the art having the benefit of this disclosure, and the generic principles described herein can be applied to other embodiments without departing from the spirit or scope of the present disclosure. Thus, it is to be understood that the description and drawings presented herein represent a presently preferred embodiment and are therefore representative of the subject matter which is broadly contemplated by the present disclosure. It is further understood that the scope of the present disclosure fully encompasses other embodiments that may become obvious to those skilled in the art having the benefit of the present disclosure and that the scope of the present disclosure is accordingly limited by nothing other than the appended claims.

What is claimed is:

1. A method for providing media content formatted according to a target digital rights management (DRM) scheme, the method comprising:
   receiving a request for media content, wherein said request specifies a target digital rights management scheme;
   determining the target digital rights management scheme from said request for the media content;
   determining a DRM free content server from which to obtain the media content;
   obtaining the DRM free media content;
   formatting the obtained DRM free media content according to the target digital rights management scheme; and
   providing the media content formatted according to the target digital rights management scheme.

2. The method of claim 1, wherein formatting includes converting at least one file of the DRM free media content to the target digital rights scheme.

3. The method of claim 2, wherein providing includes providing the at least one converted file.

4. The method of claim 1, wherein the request is received over an IP-based network.

5. The method of claim 4, wherein the IP-based network is the internet.

6. The method of claim 1, wherein providing the media content formatted according to the target digital rights management scheme includes transmitting the media content over an IP-based network.

7. The method of claim 6, wherein the IP-based network is the internet.

8. A system for providing content to a user device, the content formatted according to a target digital rights management (DRM) scheme compatible with the user device, the system comprising:
   a storage device for storing programmed modules and data;
   a processor for reading the storage device to access said programmed modules and data;
   a receiving module stored in said storage device and programmed to receive a request from the user device for the content, the content to be formatted according to the target digital rights management scheme;
   a processing module stored in said storage device and programmed to determine the target digital rights management scheme from the request from the user device;
   a matching module stored in said storage device and programmed to obtain DRM free content, and programmed to reformat the DRM free content according to the target digital rights management scheme; and
   a transmitting module stored in said storage device and programmed to provide the reformatted content to the user device.

9. The system of claim 8, wherein the user device comprises a mobile terminal.

10. The system of claim 9, wherein the mobile terminal comprises a cellular phone.

11. The system of claim 8, further comprising:
   a content server for hosting the receiving module and the processing module; and
   a matching server for hosting the matching module.

12. A system for providing content to a user device, the content formatted according to a target digital rights management (DRM) scheme compatible with the user device, the system comprising:

a content server comprising a processor and a storage device, the content server for
  hosting the content in said storage device, wherein the content is formatted according to a native digital rights management free scheme,
  receiving a request for the content, and
  using the processor to access the requested content and provide the content to the user device, the content formatted according to the target digital rights management scheme;
the content server including a matching module, the matching module programmed to determine the target digital rights management scheme specified by the request, obtain the DRM free content from the content server, reformat the obtained content according to the target digital rights management scheme, and provide the reformatted content to the content server.

13. The system of claim 12, further comprising a plurality of the content servers.

14. The system of claim 12, wherein the user device comprises a mobile terminal.

15. The system of claim 14, wherein the mobile terminal comprises a cellular phone.

16. A method for providing media content formatted according to a target digital rights management (DRM) scheme, the method comprising:

receiving a first request for media content, wherein said first request specifies a first target digital rights management scheme;
  determining the first target digital rights management scheme from said first request for media content;
  determining a DRM free content server from which to obtain the media content;
  obtaining the DRM free media content;
  formatting the obtained DRM free media content according to the first target digital rights management scheme;
  providing the media content formatted according to the first target digital rights management scheme;
  receiving a second request for media content, wherein said second request specifies a second target digital rights management scheme;
  determining the second target digital rights management scheme from said second request for media content;
  determining a DRM free content server from which to obtain the media content;
  obtaining the DRM free media content;
  formatting the obtained DRM free media content according to the second target digital rights management scheme; and
  providing the media content formatted according to the second target digital rights management scheme.

* * * * *